United States Patent [19]

Colpoys

[11] 3,891,565

[45] June 24, 1975

[54] GRAVEL PACKING FLUID

[75] Inventor: Patrick J. Colpoys, Houston, Tex.

[73] Assignee: Union Carbide Corporation, New York, N.Y.

[22] Filed: Jan. 17, 1973

[21] Appl. No.: 324,374

[52] U.S. Cl. .......... 252/8.55 R; 166/278; 252/8.5 B
[51] Int. Cl. ............................................. E21b 33/12
[58] Field of Search ...... 166/278; 252/8.55 R, 8.5 B

[56] References Cited
UNITED STATES PATENTS

| | | | |
|---|---|---|---|
| 2,727,001 | 12/1955 | Rowe | 252/8.5 B |
| 3,642,624 | 2/1972 | Howland et al. | 252/8.55 R |
| 3,675,717 | 7/1972 | Goins et al. | 166/278 |
| 3,719,601 | 3/1973 | Jacocks | 252/8.55 R |

*Primary Examiner*—Benjamin R. Padgett
*Assistant Examiner*—B. Hunt
*Attorney, Agent, or Firm*—D. J. Terminello

[57] ABSTRACT

A gravel packing fluid wherein a solid particle weighting agent is suspended in a base liquid and chrysotile asbestos fibers incorporated therein so that enough weighting agent can be suspended in the base liquid to provide a packing fluid having a density greater than 11.8 ppg.

5 Claims, No Drawings

GRAVEL PACKING FLUID

This invention relates to the production of reservoir fluids from underground incompetent reservoirs penetrated by a well and more particularly to gravel packing fluid for use in a method of gravel packing wells in incompetent formations subjected to abnormally high pressures.

Many subsurface formations in which oil and gas are present in substantial quantities are unconsolidated or only poorly consolidated, and are referred to as incompetent formations. Typical incompetent formations exist in California and in the Gulf Coast area. When fluids are produced from such formations, sand from the formation flows into the well where it may cause severe erosion of well equipment and/or plug the well and require expensive workover of the well. Continued movement of formation sands into the well sometimes removes support for formations overlying the incompetent formation with a resultant collapse of the overlying formations and severe damage to the well.

A number of techniques have been used in an effort to overcome the difficulties caused by incompetent functions. One of these techniques is gravel packing. In gravel packing, the space between slotted liner or screen and the borehole wall is packed with gravel particles larger than the formation particles but small enough so that the voids between the gravel particles are too small for the formation particles to pass through them. A number of different techniques have been used to form gravel packs. In general, they involve suspending gravel in a liquid, pumping the suspension down the well, and separating the gravel from the liquid at the bottom of the well by a settling or screening technique.

Many of the incompetent formations, particularly in the Gulf Coast area, are overpressured. The term "overpressured" is here used to designate pressures exceeding the pressure exerted by a column of 1.07 specific gravity brine having a height equal to the depth of the well. Many of these overpressured formations can be controlled with sodium chloride or calcium chloride brines. However, when a liquid with a density above 11.8 ppg (saturated calcium chloride) is required, there is no satisfactory liquid available. Mixtures of calcium chloride and zinc chloride will provide the densities, but they are not satisfactory from the economic, corrosion and safety-of-handling standpoints. The only other liquids available are drilling liquids containing insoluble weighting materials and clays for suspension, and these plug gravel packs. Since gravel packing operations may be conducted after the drilling rig has been moved from the well, the pressure control equipment available at a well during drilling may not be available during the gravel packing operation.

More recently a method of gravel packing has been developed which eliminates the dangers of blowouts that exist during the gravel packing of wells in overpressured formations. Briefly, this method comprises suspending gravel in a gravel packing fluid formed by suspending in a base liquid finely divided solid material, referred to as a weighting agent, that can be removed from the gravel pack by reaction to form a soluble material or by dissolution.

The effective specific gravity of the gravel packing fluid is high enough that the hydrostatic pressure created in the borehole by the fluid-suspension is at least as high as, and preferably exceeds, the fluid pressure in the overpressured formation. The object of this invention is to provide a new and improved gravel packing fluid-suspension for use in such method.

U.S. Pat. No. 3,675,717 issued July 11, 1972 and assigned to Gulf Research and Development Company discloses the above described method of gravel packing wells. This patent describes several fluids useful in such method. It now has been discovered that an improved gravel packing fluid suspension is obtained when asbestos is used as a suspending agent.

Up until now suspending agents were usually gums, starches and synthetic polymers. The ability of these materials to maintain weighting agents in suspension was not always satisfactory, that is to say that the weighting agent would settle rather rapidly from the fluid. As a result in the gravel packing operation wherein a casing packer is used to isolate the productive formation from the upper part of the casing in the bore, a separate fluid was used above the packer to maintain the pressure across the packer. The reason for the use of a separate fluid, was that with the relatively high settling rate of the prior art suspending agents, the weighting agent would settle out of the gravel packing fluid and collect above the packer and bind it to the casing making it necessary to drill out the packer to remove it which is a tedious and expensive procedure.

Another shortcoming of presently used suspending agents are their relatively high costs. Synthetic polymers cost about a dollar a pound. In a typical packing operation wherein a 14 ppg gravel packing fluid is necessary the suspending agent required could cost from about $2,000 to $4,000.

It now has been discovered that a gravel packing fluid can be produced, using asbestos as a suspending agent, which will have unusually good capabilities of maintaining weighting agents in suspension while maintaining desirable flow characteristics (rheological properties) of the fluid system and while being relatively inexpensive compared to prior art systems.

The gravel packing fluid used in this invention is prepared by suspending a weighting agent and the gravel in a base liquid which may be either an aqueous liquid or an oil base liquid such as diesel oil, crude oil or a water-in-oil emulsion and asbestos. Of the various types of asbestos known commercially only chrysotile asbestos is suitable for preparing a gravel packing fluid according to the invention. While asbestos derived from chrysotile will vary in properties dependent upon the deposit from which the chrysotile is obtained, nevertheless any chrysotile asbestos is effective for use in the present invention. It is preferred to employ coalimga chrysotile asbestos obtained from an unique short-fiber deposit located in central California. This asbestos ore is essentially free of hard, consolidated rock masses typical of other asbestos ores. Thus the beneficiated asbestos obtained from this ore is a high purity chrysotile product which can be fully liberated (separated into individual fibers). This minimizes the gangue that does not contribute to the suspending properties of the asbestos. Fully liberated fibers of coaling a asbestos has a diameter of about 250 angstrom units and a length-/diameter ratio ranging up to about 100/1. A gram of this asbestos has a high surface area of about 50 sq. meters. The chrysotile asbestos fibers provide maximum suspension with a minimum of asbestos which is extremely desirable in gravel packing fluid. This characteristic provides the packing fluid with maximum capacity for suspending weighting agents while not diluting the effective weight of the weighting agent.

The weighting agents incorporated in the gravel packing liquid to increase its density are finely divided solid materials having a particle size of 30 mesh or smaller whereby the weighting agent occupies voids in the gravel pack between the particles of gravel and does not affect substantially the spacing of the gravel particles. The size of the weighting agent particles used will, therefore, be dependent on the size of gravel used in the gravel pack. If 40–60 mesh sand is used in the gravel pack, weighting agent particles should be smaller and have a size such as 200 mesh. Excessive viscosity of the gravel packing liquid will be caused if the weighting agent particles are too small, and for that reason the size of the particles should exceed 2 microns.

The weighting agents should have a high density to allow an increase in the density of the gravel packing liquid without an excessive volumetric concentration of solids which could make handling of the gravel packing liquid more difficult. It is essential to the weighting agent that it be removable from the gravel pack without affecting the gravel particles. The weighting agent should be soluble in a solvent which can be displaced through the gravel pack or should be capable of reacting to form soluble reaction products with a liquid that does not react with or dissolve the gravel.

Preferred weighting agents used in this invention are iron oxides such as ferric and ferrous oxides. Ferrous oxide is preferred over ferric oxide because of its higher solubility in 15 percent hydrochloric acid which is the fluid normally used to remove the weighting agent. Further, ferrous oxide being magnetic is easier to refine and thus less expensive. Up until now, ferrous oxide has not been used in oil well operations because of its magnetic properties. However, it has been found that the magnetic properties of ferrous oxide have no deleterious effects in gravel packing fluids.

The gravel used in the gravel pack is usually a graded siliceous sand suspended in the gravel packing liquid in a concentration of ½ to 10 pounds per gallon, and more commonly in a concentration of 1 to 5 pounds per gallon. Other solid particles such as spherical glass beads can be used as "gravel" to form the gravel pack. The size of the gravel used depends upon the characteristics of the incompetent formation. The openings between the particles of gravel should be small enough to prevent substantial passage of formation sands through the gravel pack. Ordinarily formation sand particles will bridge across openings in the gravel pack, and for that reason it is not essential that the openings be smaller than the formation sand particles to prevent substantial movement of formation sands through the gravel pack. If the formation sands are coarse, such as the sands that occur in incompetent formations in California, relatively large gravel particles having a size in the range of 6 to 10 mesh in the U.S. Sieve Series can be used. It is necessary to use smaller gravel usually in the range of 20 to 40 mesh, and in some instances as small as 40 to 60 mesh, in gravel packs in wells in areas along the coast of, and offshore of, the Gulf of Mexico. Customarily, a narrow range of particle sizes is used in the gravel pack. A rule of thumb that has been used is that the smallest particles have a diameter approximately one-half that of the largest particles.

A typical fluid according to the invention consists essentially of salt water as the base liquid, ferrous oxide suspended in the salt water, the ferrous oxide particles having a particle size in excess of 2 microns and liberated chrysotile asbestos fibers to provide a packing fluid having a density greater than 11.8 ppg.

A specific example of a typical fluid according to the invention and how to form such fluid is included herein for illustrative purposes only so that those skilled in art will know how to practice the invention. The example is not to be considered as limiting the invention beyond the scope of the claims contained herein.

An 18 pound per gallon (ppg) fluid is typically formed as follows. A calculation is usually first made assuming that the total weight of the packing fluid suspension will be 100 grams. Then (1). X grams of weighting agent + Y grams of base liquid = 100 grams Now assuming brine is the base liquid and the weighting agent preferably $Fe_3O_4$ contains 1 percent asbestos the following can be used.

1 gram of asbestos + 99 grams $Fe_3O_4$ = 100 grams. The specific gravity of coalinga asbestos is 2.5 g/cc and that of natural magnetite is 5.18 g/cc. Then the cc/gram for each respectively would be 0.40 cc/gram and 0.193 cc/gram. One (1) gram of asbestos would occupy 0.40 cc. Ninety nine (99) grams of magnetite would occupy 19.107 cc. The total then is 19.51 cc of 100 grams, therefore, 1 gram would occupy 0.195 cc. The specific gravity (g/cc) of the weight agent plus asbestos would be 5.12 g/cc.

The specific gravity of brine is 1.07 g/cc. Therefore, cc/g of brine is 0.935. Now for an 18 ppg system, the specific gravity would be 18 ppg/8.331 ppg or 2.161. Therefore, cc/g would be 0.4627 and cc/100 grams would be 46.27. Since 100 grams of packing fluid occupies 46.27 cc it can be said that (X grams of weight agent mix) (0.195 cc/gram) + Y grams of brine (0.935 cc/g) = 46.27:

0.195 X + 0.935 Y = 46.27 but since Y from equation (1) equals Y = 100 − X:

0.195 X + 93.5 − 0.935 X = 46.27

0.74X = 47.23

X = 63.82 grams of weight agent and asbestos. Because 1 percent of the weighting agent is asbestos, the weight of asbestos is 0.638g and magnetite 63.18. From equation 1 100 − 63.82 = 36.18 grams of brine.

To convert to pounds per barrel, we do the following:
18 ppg fluid × 42 gals/bbl = 756 lb/bbl 756 × 0.6382 percent of weight agent = 482.5 lb. of weighting agent and therefore 273.5 lb. of brine. One gallon of brine equals 8.914 lb. Therefore, 30.6 gal. of brine are required and suspended therein are 4.83 lb. of asbestos and 477.67 lb. of magnetite.

While it is necessary that the packing fluid be able to suspend a weight agent therein, it should also have good flow or rheological properties. A packing fluid having an average viscosity of greater than 100 centipoise is unacceptable because it becomes difficult to pump in a well system. The system described above in the example has a viscosity of 86 cps which is well within the limits defined.

Other systems were made with 2 percent asbestos 3 percent asbestos and 5 percent asbestos mixed with magnetite. These systems where tested for rheological properties, suspending properties and solubilities. The resulting data is shown in the following Tables 1 through III.

TABLE I

Rheological Properties of Magnetite-Asbestos-Weighted Well Fluids

1. Instrument - Fann Viscometer, Model 35 with a No.1 Spring and standard Rotor and Bob.
2. Standard API procedure.
3. Target specs.: AV 100 cps. max., 10 sec.gel 20 lb./100 ft.$^2$, 10 min. gel 50 lb/100 ft.$^2$

| Well Fluid | | Weighting Agent Compound No. | | | |
|---|---|---|---|---|---|
| | | 1 % Asbestos | 2 % Asbestos | 3 % Asbestos | 5 % Asbestos |
| Wt.-12.0 lb/gal | AV(cps.) | 7 | 14 | 22 | 48 |
| Sp.gr. 1.44 | PV (cps.) | 7 | 11 | 19 | 42 |
| | YP (cps.) | 0 | 7 | 5 | 11 |
| *10 sec.gel | (lb./100ft.$^2$) | 6 | 4 | 2 | 8 |
| Wt.-14.0 lb/gal | AV | 21 | 40 | 48 | 63 |
| Sp.gr. 1.68 | PV | 9 | 13 | 25 | 24 |
| | YP | 24 | 55 | 45 | 78 |
| *10 sec.gel | | 28 | 8 | 17 | 24 |
| Wt.-16.0 lb/gal | AV | 50 | 75 | 70 | (too viscous for analysis) |
| Sp.gr. 1.92 | PV | 23 | 24 | 16 | |
| | YP | 55 | 102 | 108 | |
| *10 sec.gel | | N.D. | 24 | 37 | |
| Wt.-18.0 lb/gal | AV | 86 | | | |
| Sp.gr. 2.16 | PV | 69 | | | |
| | YP | 34 | | | |
| *10 sec.gel | | 34 | | | |

*10-second and 10-minute gel strength data are comparable for asbestos systems

TABLE II

Settling Rate and Final Settled Volume of Magnetite-Asbestos Well Fluid Weighting Compounds

| Settling Rate | Weighting Compounds | | | |
|---|---|---|---|---|
| Time (Min.) | 1 | 2 | 3 | 5 |
| 0 Settled Vol. (ml) | 1000 | 1000 | 1000 | 1000 |
| 5 | 760 | 815 | 815 | 890 |
| 10 | 640 | 690 | 725 | 850 |
| 15 | 590 | 655 | 690 | 805 |
| 20 | 570 | 625 | 665 | 785 |
| 25 | 560 | 605 | 650 | 760 |
| 30 | 545 | 595 | 640 | 740 |
| 35 | 530 | 585 | 630 | 720 |
| 40 | 520 | 575 | 625 | 705 |
| 45 | 515 | 570 | 620 | — |
| 50 | — | 565 | 615 | — |
| 55 | 500 | 560 | 610 | — |
| 60 | 495 | 555 | 605 | — |
| 18 Hours | 475 | 520 | 560 | 575 |

Analysis of the Settled Solids From the 18-Hour Settling Test

| | | | | |
|---|---|---|---|---|
| 1. Settled vol. (ml) | 475 | 520 | 560 | 575 |
| 2. Contained solids (g.) | 516 | 411 | 412 | 414 |
| 3. Contained solids (cc.) | 111 | 89 | 90 | 92 |
| 4. Contained water (ml) | 364 | 431 | 470 | 483 |
| 5. Total wt. in settled solids (g.) | 880 | 842 | 882 | 897 |
| 6. Sp. gr. of settled solids volume | 1.85 | 1.62 | 1.58 | 1.56 |
| 7. Lb./gal. wt. of settled solids volume | 15.4 | 13.5 | 13.2 | 13.0 |

TABLE III

Chemical and Physical Characteristics of Magnetite-Asbestos Well Fluid Weighting Compounds

| Weighting Compound | Composition Parts/100 by Wt. | | Compound Sp. Gravity (g./cc.) | Compound Solubilities (Wt. %) | |
|---|---|---|---|---|---|
| | Asbestos | Fe$_3$O$_4$ | | Acid | Mud Acid 13% HCL & 2% HF |
| 1 | 1 | 99 | 5.12 | 92.4 | 97.3 |
| 2 | 2 | 98 | 4.62 | 92.4 | 94.6 |
| 3 | 3 | 97 | 4.58 | 92.0 | 95.4 |
| 5 | 5 | 95 | 4.50 | 90.0 | 94.3 |

1 wt. percent coalinga asbestos appears to be optimum for very high-density fluids. This composition has acceptable rheological properties in fluids weighted to 15 to 18 pounds per gallon (dilute suspensions settle to a slurry density of 15 pounds per gallon).

Asbestos at 2 and 3 wt. percent provides a weighting agent suitable for well fluid weights ranging from 13.5 to 16 pounds per gallon.

At 5 percent asbestos the maximum fluid weight is limited to 14 pounds per gallon and to 13 pounds per gallon minimum weight.

Fluids lighter than 13 pounds per gallon will require more than 5 wt. percent asbestos to suspend the magnetite and limit the settled solids density.

What is claimed is:

1. A gravel packing fluid consisting essentially of a base liquid, (a solid particle weighting agent) iron oxide suspended in said base liquid and chrysotile asbestos fibers incorporated therein such that enough (weighting agent) iron oxide can be suspended in said base liquid to provide a packing fluid having a density greater than 11.8 ppg, said chrysotile asbestos fibers incorporated in said iron oxide having a solubility of at least about 90 weight percent in hydrochloric acid.

2. Fluid according to claim 1 wherein said fluid has a viscosity of not more than 100 centipoise.

3. Fluid according to claim 1 wherein said chrysotile asbestos is present in the amount of up to about 5 wt percent of the weighting agent.

4. Fluid according to claim 1 wherein the iron oxide is magnetite.

5. A fluid according to claim 1 having a density of 18 ppg and wherein the base liquid is brine, the weighting agent is magnetite and the asbestos is 1 wt percent of the magnetite.

A review of the data shows that a weighting agent compounded with 99 wt. percent natural magnetite and

* * * * *

UNITED STATES PATENT OFFICE
CERTIFICATE OF CORRECTION

Patent No. 3,891,565          Dated June 24, 1975

Inventor(s) Patrick J. Colpoys

It is certified that error appears in the above-identified patent and that said Letters Patent are hereby corrected as shown below:

Column 2, line 51, "coalimga" should be --coalinga--

Column 2, line 61, "coaling a" should be --coalinga--

Column 8, lines 4 and 5, cancel "A review of the data shows that a weighting agent compounded with 99wt. percent natural magnetite and " and insert the same in column 6, before line 1.

Signed and Sealed this sixteenth Day of December 1975

[SEAL]

Attest:

RUTH C. MASON
*Attesting Officer*

C. MARSHALL DANN
*Commissioner of Patents and Trademarks*